(12) United States Patent
Fukushima et al.

(10) Patent No.: US 7,259,826 B2
(45) Date of Patent: Aug. 21, 2007

(54) IMAGE RECORDING APPARATUS RECORDING LID OPEN/CLOSE HISTORY

(75) Inventors: Kimitake Fukushima, Kanagawa (JP); Junichi Kurumisawa, Saitama (JP)

(73) Assignee: Fujifilm Corporation, Tokyo (JP)

( * ) Notice: Subject to any disclaimer, the term of this patent is extended or adjusted under 35 U.S.C. 154(b) by 76 days.

(21) Appl. No.: 11/185,828

(22) Filed: Jul. 21, 2005

(65) Prior Publication Data

US 2006/0017892 A1 Jan. 26, 2006

(30) Foreign Application Priority Data

Jul. 23, 2004 (JP) ............................. 2004-215300

(51) Int. Cl.
*G03B 29/00* (2006.01)
(52) U.S. Cl. ....................................... 355/29
(58) Field of Classification Search ................ 355/29, 355/27, 40; 358/474; 270/58.07; 399/341
See application file for complete search history.

(56) References Cited

U.S. PATENT DOCUMENTS 6,320,643 B1 * 11/2001 Morita ......................... 355/29

FOREIGN PATENT DOCUMENTS

| JP | 7-114109 A | 5/1995 |
| JP | 2001-142154 A | 5/2001 |
| JP | 2003-295330 | * 10/2003 |
| JP | 2003-295330 A | 10/2003 |

* cited by examiner

*Primary Examiner*—Peter B. Kim
*Assistant Examiner*—Chia-how Michael Liu
(74) *Attorney, Agent, or Firm*—Birch, Stewart, Kolasch & Birch, LLP

(57) ABSTRACT

A magazine containing a roll of recording paper is removably loaded in an image recording apparatus. A sensor for detecting a leading end of the recording paper is provided in the image recording apparatus near a paper outlet of the loaded magazine. The image recording apparatus has a device for calculating a transport amount of the recording paper till the leading end of the recording paper is detected by the sensor. If the calculated transport amount is less than a predetermined value, the leading end of the recording paper is considered to be fogged or stained, so an edge treatment is carried out to cut a certain length by a cutter away from the leading end before the recording paper is fed into an image recording section. The magazine is provided with a memory for recording an open/close history of its lid that is opened and closed to set the recording paper in the magazine. The image recording apparatus reads the open/close history from the memory. If the open/close history indicates that the magazine lid was opened while the magazine was removed from the image recording apparatus, it is judged that the magazine contains a new roll of recording paper, so the edge treatment is carried out even while the transport amount is more than the predetermined value.

2 Claims, 6 Drawing Sheets

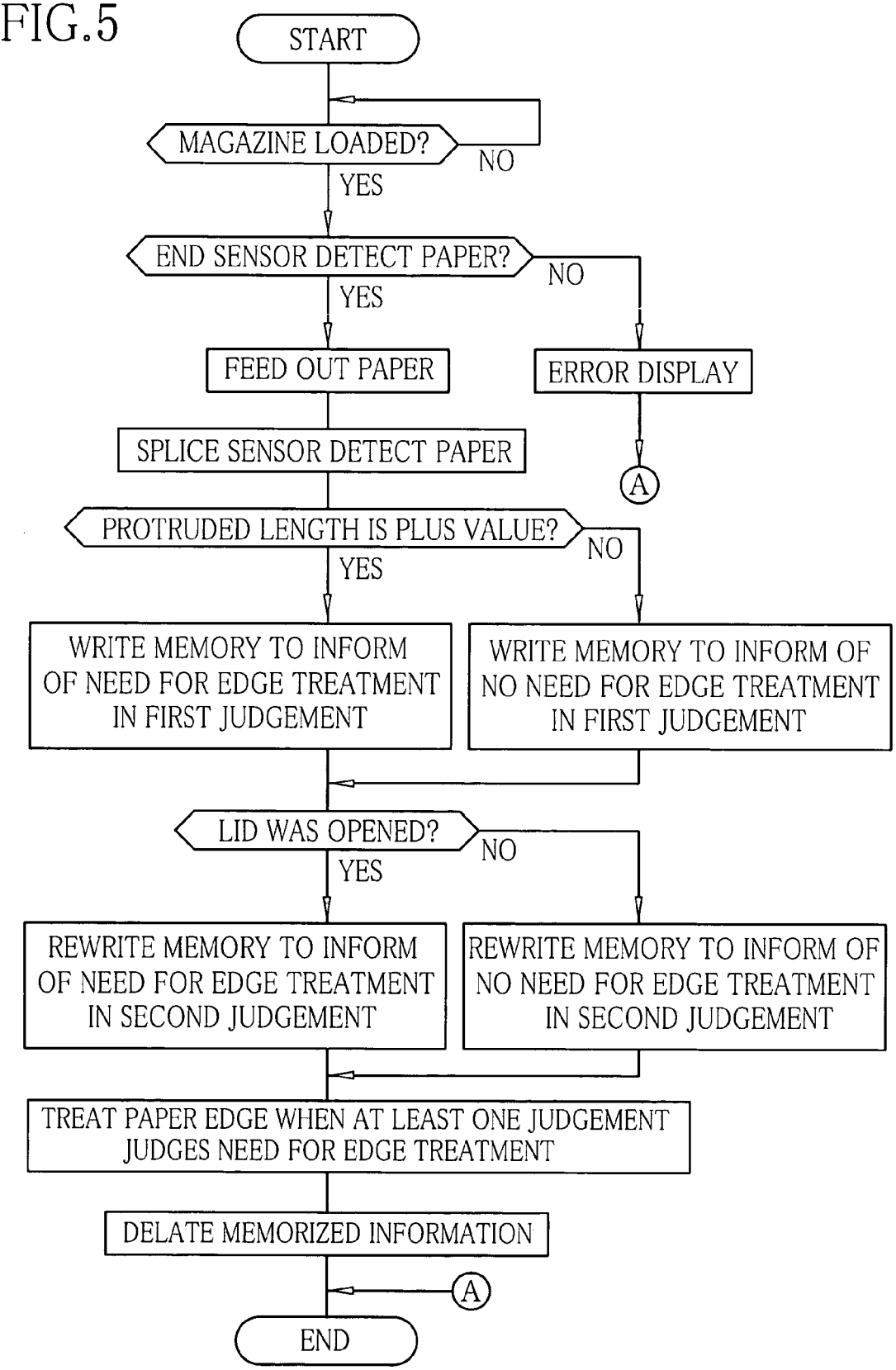

IMAGE RECORDING APPARATUS RECORDING LID OPEN/CLOSE HISTORY

FIELD OF THE INVENTION

The present invention relates to an image recording apparatus that can perform an edge treatment for a recording material advanced from a magazine.

BACKGROUND ART

An image recording apparatus is known that photoelectrically reads images photographed on photographic film by an image reading apparatus and records the images on a photosensitive material (photographic paper) by exposing it to recording light that is projected according to the read image data. In such an image recording apparatus, a roll of photosensitive material is contained in a magazine which is loaded in a magazine room, so along web of photosensitive material is fed out from the magazine into the apparatus main body. The long web of photosensitive material is cut by a cutter, which is provided in the apparatus main body, into a given length and becomes a photo print through a series of processing including exposure, developing and drying.

When the photosensitive material contained in the magazine is finished up in the image recording apparatus, the magazine is removed and refilled with another new roll of photosensitive material. In changing the photosensitive materials, a leading edge of the new photosensitive material is not always cut rightly but often cut irregularly or aslope. If the leading end of the new photosensitive material is protruded from the magazine, the protruding length can be stained with dust or can be exposed and thus fogged. In addition, fingerprint might remain on the leading end of the photosensitive material because workers can mistakenly touch the photosensitive material with their bare hands during replacement of it. For this reason, so as not to use such a leading end of any new photosensitive material, an edge treatment to cut away the leading end is carried out every time the magazine refilled with the new photosensitive material is loaded in the magazine room.

In the image recording apparatus, it often happens that a magazine with an in-use photosensitive material is removed from the magazine room and another magazine containing a different size photosensitive material is newly loaded in order to use photosensitive materials of various sizes. In this case, it is often uncertain whether the photosensitive material in the above-mentioned other magazine is an in-use one having already had the edge treatment or an unused one having had no edge treatment yet. For this reason, in order to deal with both the in-use photosensitive material and the unused one, the edge treatment is carried out whenever a magazine is newly loaded in the magazine room, regardless of the condition of the photosensitive material contained in the newly loaded magazine. As a result, the edge treatment is done repeatedly on the in-use photosensitive material, so the photosensitive material is wastefully cut and disposed, so the waste of photosensitive material increases uneconomically.

Usually, a cutter for the edge treatment is disposed in the apparatus main body. In order to shorten a transport distance of the photosensitive material from a paper outlet of the loaded magazine to the cutter, it is preferable for the cutter to be arranged as near the paper outlet as possible. For this reason, it is known in the art that a conveyer roller for conveying the photosensitive material from a magazine to the apparatus main body is arranged not in the apparatus main body but in the magazine itself. The magazine with the conveyer roller is provided with a pulley that gets connected to a drive source, which is disposed in the apparatus main body, when the magazine is loaded in the apparatus main body. The conveyer roller is rotated by rotating the pulley by the drive source. The pulley in the magazine can accidentally rotate while the magazine is being removed from the magazine room of the apparatus main body, causing the leading end of the contained photosensitive material to protrude from the magazine. In that case, the leading end of the photosensitive material gets dusted or fogged.

An image recording apparatus disclosed in Japanese Laid-open Patent Application No. H07-114109 has a detector to detect a leading edge of a photosensitive material, the detector being arranged before a cutter in a feed out direction of the photosensitive material. The movement of the cutter is controlled based on how long the photosensitive material is transported till the detector detects the leading edge of the photosensitive material.

An image recording apparatus disclosed in Japanese Laid-open Patent Application No. 2001-142154 is provided with a memory to store information on whether a photosensitive material contained in a magazine goes through the edge treatment or not. With reference to the information stored in the memory, the image recording apparatus performs the edge treatment only when the photosensitive material does not go through the edge treatment yet. An image recording apparatus shown in Japanese Laid-open Patent Application No. 2003-295330 refers to an open/close history of a magazine lid that is opened and closed each time a new roll of photosensitive material is set in a magazine, and performs the edge treatment if it judges based on the open/close history that the edge treatment hasn't been done on the contained photosensitive material yet.

The image recording apparatus disclosed in Japanese Laid-open Patent Application No. H07-114109, however, carries out the edge treatment every time the magazine is loaded, which cannot avoid the increase of waste photosensitive materials in total.

The image recording apparatus disclosed in Japanese Laid-open Patent Application No. 2001-142154 doesn't carry out the edge treatment for an in-use photosensitive material which has already had the edge treatment. The image recording apparatus disclosed in Japanese Laid-open Patent Application No. 2003-295330 performs the edge treatment for an in-use photosensitive material only when its leading end get fogged because the magazine containing the photosensitive material is removed for a long time from the magazine room or when the leading end has tendency to curl. Accordingly, the image recording apparatus of the last prior art cannot satisfy such needs for the edge treatment that are resulted for example from a deviation of a leading edge of a photosensitive material contained in the magazine with the pulley and the conveyer roller. As described above, the leading end can be stained or fogged when it deviates or protrudes by mistake with accidental rotation of the pulley while the magazine is removed from the magazine room. Conventionally, if the operator notices that the photosensitive material is protruded from the magazine, the operator should carry out the edge treatment on the protruded leading end of the photosensitive material. The operation, however, increases the burden on the operator. On the contrary, in a case where it is invisible that a leading end of a photosensitive material is protruded from a magazine, the image recording apparatus moves on to the following processes without any edge treatment even though the leading end suffers dust or fog.

SUMMARY OF THE INVENTION

In view of the foregoing problems, an object of the present invention is to provide an image recording apparatus that not only decreases the waste of the photosensitive material but also carries out the edge treatment on necessary cases without fail.

To achieve the above and objects, an recording apparatus of the present invention comprises a magazine containing a long web of the recording material, the magazine being removably loaded in a main body of the image recording apparatus; a cutter for cutting the recording material before the recording material is fed into an image recording section of the image recording apparatus; a sensor for detecting a leading end of the recording material at a position before the cutter in a feed out direction of the recording material; a detection device for detecting a transport amount of the recording material till the leading end of the recording material is detected by the sensor; and a control device for controlling an edge treatment to cut the leading end of the recording material by a given length by use of the cutter if the detected transport amount is less than a predetermined value.

If the leading end of the recording material almost protrudes out of the magazine or is located close to a paper outlet of the magazine, the detected transport amount will be less than the predetermined value. In that case, the leading end can be fogged or stained with dusts, so it is necessary to cut off the leading end.

According to a preferred embodiment, the magazine comprises a device for recording an open/close history of a lid of the magazine, which is opened and closed to set the recording material in the magazine, and the control device reads the open/close history from the recording device, to control the cutter to carry out the edge treatment if the open/close history indicates that the magazine lid was opened while the magazine was removed from the image recording apparatus, regardless of whether the detected transport amount is less or more than the predetermined value.

Thereby, the edge treatment is executed whenever the magazine is reloaded with an unused recording material.

The magazine preferably comprises a driving power input member and conveyer rollers rotated by a driving power transmitted through the driving power input member, the driving power input member being coupled to a driving source located in the main body of the image recording apparatus as the magazine is loaded in the main body of the image recording apparatus, the conveyer rollers rotating to feed the recording material out of the magazine into the image recording section of the image recording apparatus.

The detection device preferably detects the transport amount of the recording material by calculation based on a rotational amount of the conveyer rollers.

According to a further preferred embodiment, the control device controls the edge treatment such that the leading end is cut by a first length if the detected transport amount is less than the predetermined value but the open/close history indicates that the magazine lid is kept closed, that the leading end is cut by a second length if the detected transport amount is more than the predetermined value but the open/close history indicates that the magazine lid was opened, and that the leading end is cut by a longer length chosen between the first and second lengths if the detected transport amount is less than the predetermined value and the open/close history indicates that the magazine lid was opened.

The first length is preferably a protruding length of the leading end from a predetermined internal position of the magazine, whereas the second length is preferably a length of a leading area of the recording material where the risk of fogging, irregular cutting or fingerprints is high. According to the present invention, the waste of recording material is reduced to the minimum because only a necessary length is cut in the edge treatment.

The image recording apparatus of the present invention is also applicable in the situation that there is a need for edge treatment since end position of the recording material is shifted from a proper position by incorrect operation at the replacement of the magazine, for example which contains the in-use recording material having already had the edge treatment.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein:

FIG. 5 is a flowchart illustrating a process sequence of an edge treatment; and

DETAILED DESCRIPTION OF THE PREFERRED EMBODIMENTS

Figure 1:
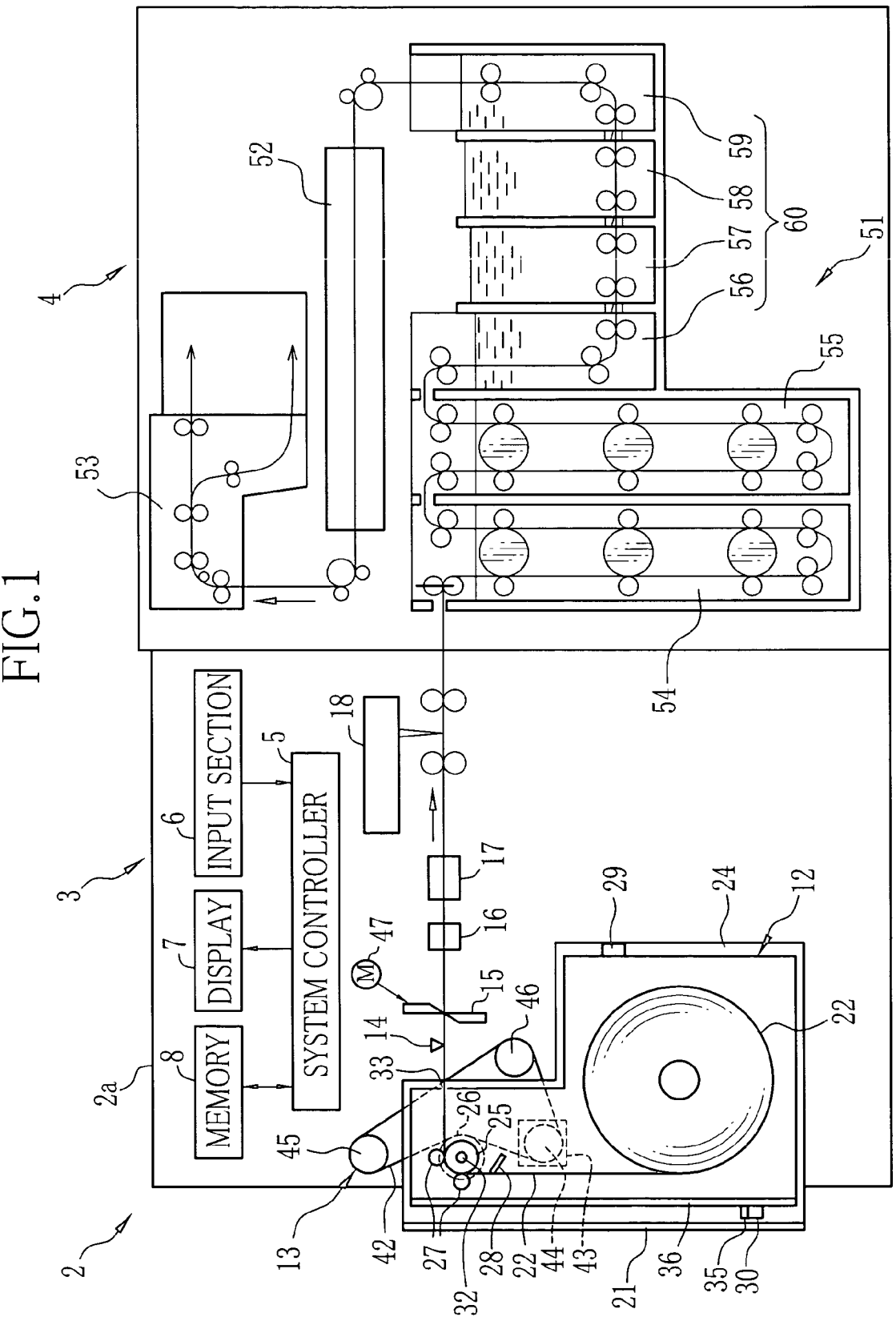
FIG. 1 is a schematic diagram illustrating an image recording apparatus according to an embodiment of the present invention.

As shown in FIG. 1, an image recording apparatus 2 consists of a printer section 3 and a processor section 4. The movement of every part of the printer section 3 and the processor section 4 is controlled by a system controller 5. Operator's commands are fed to the system controller 5 through an input section 6, and the operator is notified of the state of system through a display 7. Moreover the system controller 5 is connected to a memory 8, which enables the system controller 5 to store necessary information.

The printer section 3 has a magazine 12, a power transmission device 13, a splice sensor 14, a cutter 15, a back-printing section 16, a shift mechanism 17, and an exposure device 18. The magazine 12 contains a roll of photosensitive recording paper 22, hereinafter referred to as the recording paper 22. The magazine 12 is removably loaded in a magazine room 24 of the image recording apparatus 2, and is light-tightly held in the magazine room 24 when a door 21 of the magazine room 24 is closed.

Figure 2:
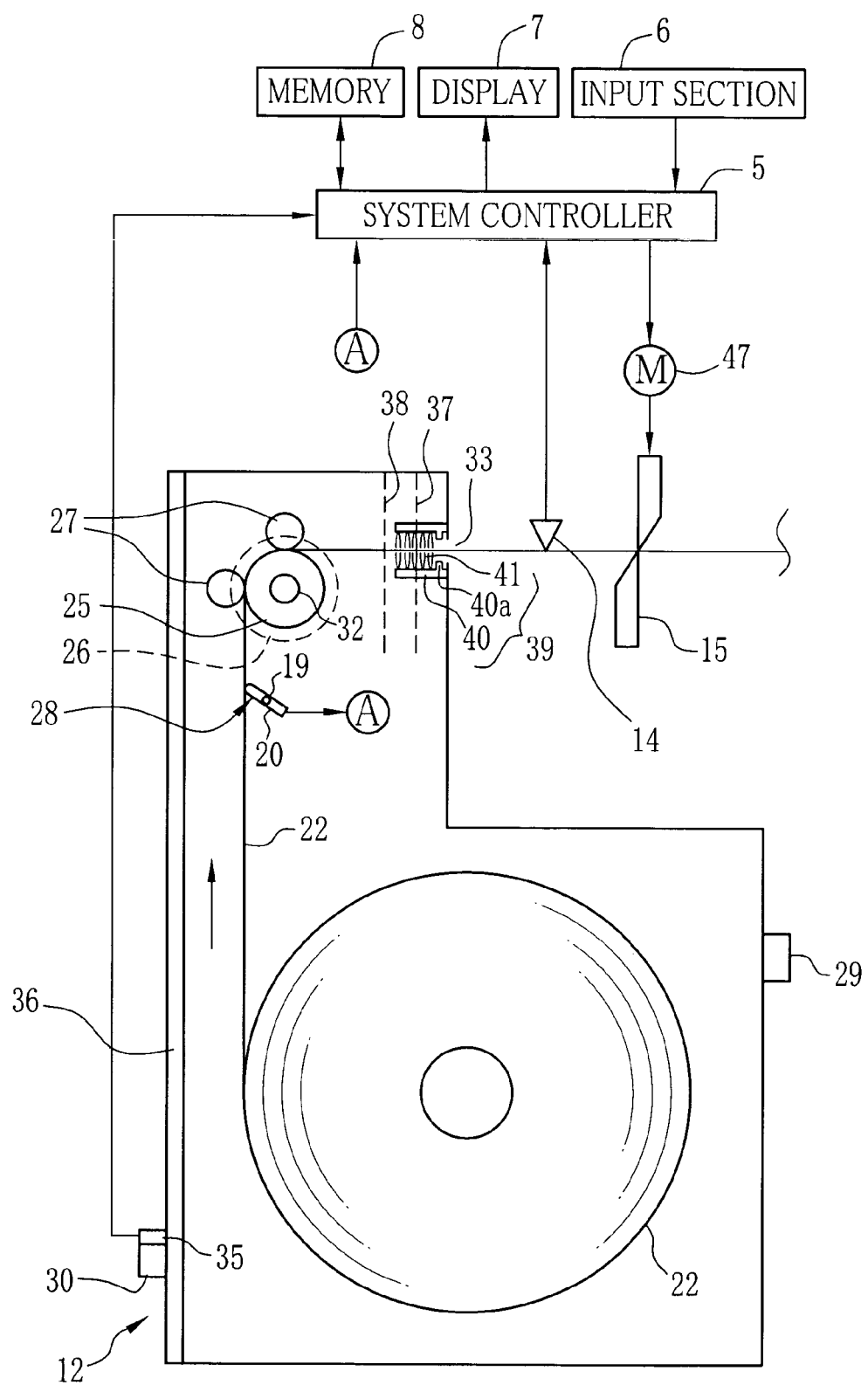
FIG. 2 is a schematic diagram illustrating a magazine loaded in the apparatus main body of the image recording apparatus.

As shown in FIG. 2, the magazine 12 has a drive roller 25, a pulley (a driving power input member) 26, nip rollers 27, an end sensor 28, an ID chip 29, an open/close history recording device 30 and a detecting sensor 35. FIG. 2 doesn't show the power transmission device 13 and the magazine room 24 for convenience sake.

The drive roller 25 is pivotally held. The pulley 26 is placed on the side of the magazine 12 attached to a rotary shaft 32 of the drive roller 25. When the magazine 12 is loaded in the magazine room 24, the pulley 26 engages with an after-mentioned belt 42 of the power transmission device 13 (see FIG. 1) and rotates as the belt 42 is driven. Sharing a rotary shaft 32 with the pulley 26, the drive roller 25 rotates together with the pulley 26. The nip rollers 27 are arranged to face the drive roller 25, with their peripheral surfaces in contact with the peripheral surface of the drive roller 25. When the recording paper 22 is newly set in the magazine 12, the recording paper 22 is nipped between the drive roller 25 and the nip rollers 27. The drive roller 25 and the nip rollers 27 constitute conveyer rollers for conveying the recording paper 22. The end sensor 28 is to detect whether there is the recording paper 22 or not. The end sensor 28 consists of a sensor body 20 which tilts about its shaft 19 when it touches the recording paper 22, and a photo-interrupter that is not shown in the drawings but sends detection signals to the system controller 5 as it detects the tilt of the sensor body 20. The end sensor 28 is arranged inside the magazine 12 before the drive roller 25 in a paper feed out direction. The ID chip 29 is to identify the magazine 12. The ID chip 29 stores ID information. The ID information stored in the ID chip 29 is read to identify the magazine 12 when the magazine 12 is loaded. Based on the ID information, the system controller 5 can determine what kind of the recording paper 22 is contained in the magazine 12, including the width of the recording paper 22 and the like.

The open/close history recording device 30 is to store an open/close history of a magazine lid 36 of the magazine 12. The open/close history recording device 30 has a circular disk which is not shown in the drawings but rotates in a given amounts every time the magazine lid 36 opens or closes. Concavity and convexity are formed on a surface of the circular disk of the open/close history recording device 30, and are detected by the detecting sensor 35. The detection values of the detecting sensor 35 are sent to the system controller 5. Instead of the concavity and convexity, it is possible to use ferromagnetic and nonmagnetic materials for the open/close history recording device, like the recording apparatus known for example from the above-mentioned Japanese Laid-open Patent Application No. 2003-295330.

The system controller 5 identifies the magazine 12 based on the ID information from the ID chip 29 and compares a detection value that is sent from the detecting sensor 35 at the present loading of the magazine 12 with a detection value as being sent from the detecting sensor 35 at the last loading of the magazine 12. If these two detection values are identical, it is judged that the magazine lid 36 remains closed. In that case, the open/close history is regarded as "Close". On the contrary, if these two detection values differ from each other, it is judged that the magazine lid 36 was opened and closed. In that case, the open/close history is regarded as "Open".

The recording paper 22 contained in the magazine 12 is conveyed outside through a paper outlet 33. Near the paper outlet 33, a shutter 39 is disposed in order to prevent the light from leaking in the magazine 12. The shutter 39 is arranged so as to face the paper path of the recording paper 22 from both sides and consists of a displaceable member 40 and teremp 41 put on the surface of the displaceable member 40. Because bunches of plural hairs are stitched together, there are apertures among stitches at the base of the teremp 41. In order to prevent the light from leaking out the apertures, the displaceable member 40 is formed with ridges 40a which cover the base of the teremp 41. The shutter 39 opens and closes as the magazine 12 is loaded in the magazine room 24.

It is, however, difficult to completely shut out the light even with the closed shutter 39 when the magazine 12 is in a bright place, so that fog can occur in a leading area of the recording paper 22 from the paper outlet 33 to a dashed line 37 shown in FIG. 2. In the following description about the edge treatment of the recording paper 22, a protruding length represents the leading area located forward from the dashed line 37. When the magazine 12 containing an in-use recording paper 22 is removed from the magazine room 24, the recording paper 22 is rewound till the leading edge of the recording paper 22 gets back to a rewind position shown by another dashed line 38. At this rewind position, the leading end of the recording paper 22 has no risk of being fogged.

Figure 3:
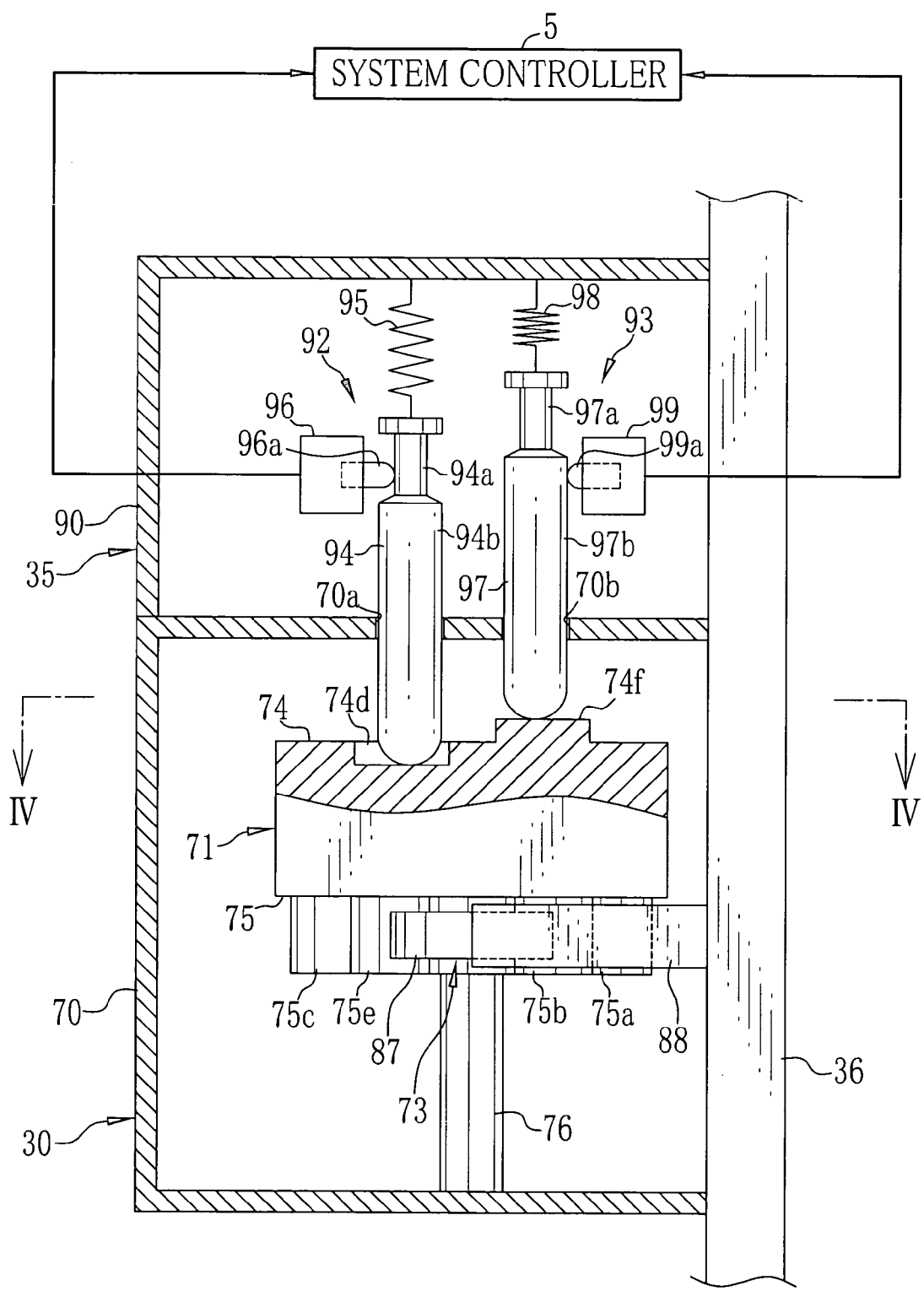
FIG. 3 is a schematic diagram illustrating an open/close history recording device and a detecting sensor.
Figure 4A:
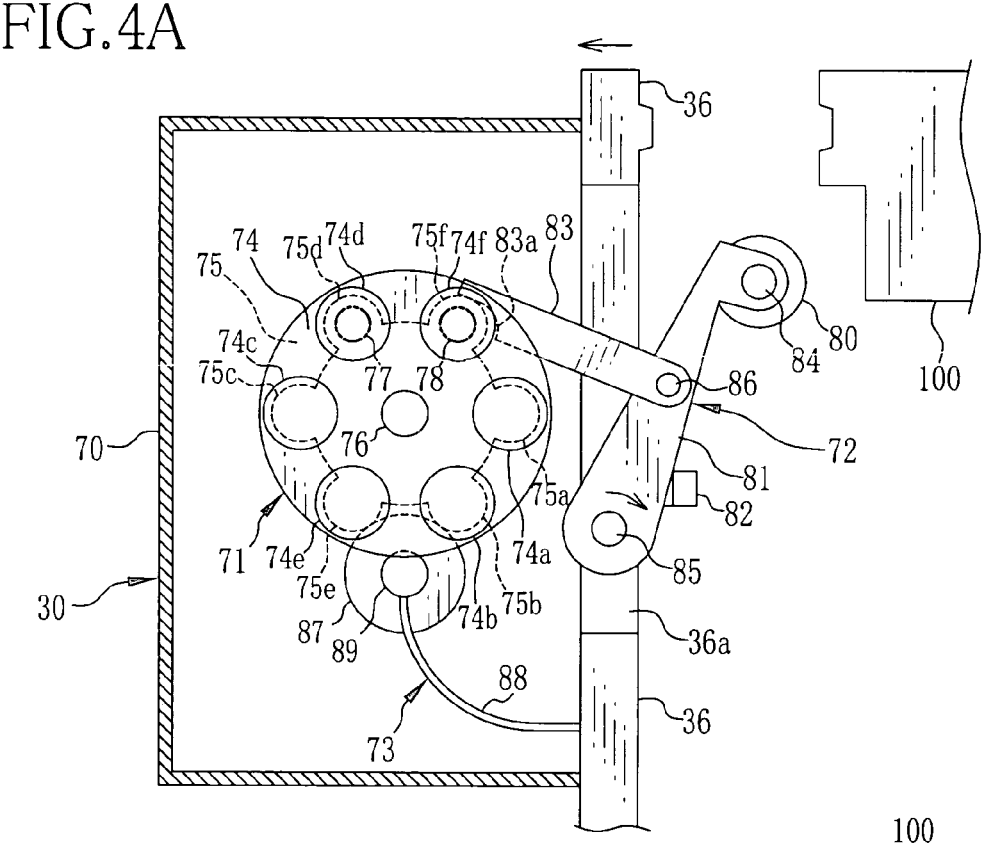
FIG. 4 is a sectional view of an open/close history recording device along a line IV-IV in FIG. 3.

FIG. 3 is a schematic configuration diagram illustrating the open/close history recording device 30 and the detecting sensor 35, and FIG. 4A is a schematic sectional view of the open/close history recording device along a line IV-IV in FIG. 3. As illustrated in the drawings, the open/close history recording device 30 and the detecting sensor 35 are provided on the magazine lid 36.

The open/close history recording device 30 consists of a cover 70 for covering the periphery thereof, a rotatable disk 71, a disk rotation mechanism 72 (see FIG. 4A) for rotating the disk 71 when the magazine lid 36 is closed, and a stopper mechanism 73 for controlling rotation of the disk 71.

The disk 71 has a surface 74 formed with concave portions 74a-74d and convex portions 74e and 74f at predetermined intervals. The disk 71 has a back surface 75 formed with arcuate protruding portions 75a-75f which respectively correspond to the concave portions 74a-74d and the convex portions 74e and 74f. The disk 71 is rotatable about a central axis 76 attached to the cover 70. In FIG. 4A, an area 77 shows a contacting area with the rod 94 described below, and an area 78 shows a contacting area with a rod 97 described below.

The disk rotation mechanism 72 consists of a roller 80, a supporting arm 81, a stopper 82, and a pushing arm 83. The roller 80 is provided on the leading end of the supporting arm 81, which is rotatable about the axis 84. The supporting arm 81 is swingable about an axis 85 provided on the magazine lid 36, and is biased by a twisted coil spring (not shown) provided on the axis 85 in a clockwise direction in FIG. 4A. The rotation of the supporting arm 81 to a biasing direction is controlled by the stopper 82 provided on the magazine lid 36. The pushing arm 83 is swingably attached to the central portion of the supporting arm 81 via the axis 86. The leading end of the pushing arm 83 is formed with a pushing portion 83a which is cut out in an arc-shaped manner so as to be caught on the protruding portions 75a-75f. It is noted that an opening 36a is formed on the magazine lid 36 so that every part of the disk rotation mechanism 72 can be moved freely.

The stopper 73 consists of a roller 87 and a leaf spring 88. The roller 87 is rotatable about an axis 89. One end of the leaf spring 88 is fixed to the axis 89, and a second end of the leaf spring 88 is fixed to the magazine lid 36. The roller 87 is biased to the protruding portions 75a-75f of the disk 71 by the leaf spring 88.

The detecting sensor 35 consists of a first detecting unit 92 and a second detecting unit 93, and is covered with a cover 90. The first detecting unit 92 consists of a rod 94, a compression spring 95, and a detecting element 96. The rod 94 is inserted into an opening 70a formed on the cover 70, in which diameter of an upper portion 94a is set to be smaller than that of a central portion 94b. The compression spring 95 biases the rod 94 to the surface 74 of the disk 71. The rod 94 is moved in a vertical direction according to the concavity and convexity of the surface 74 of the disk 71.

The detecting element 96 is a mechanical switch disposed on a side of the rod 94. The detecting element 96 has a detecting portion 96a biased to the rod 94 by a spring. The detecting element 96 outputs OFF signal to the system controller 5 when the detecting portion 96a protrudes, or outputs ON signal to the system controller 5 when the detecting portion 96a retreats. When the lower end of the rod 94 contacts with the concave portions of the disk 71, the detecting portion 96a contacts with the upper portion 94a of the rod 94 and the detecting element 96 outputs OFF signal. When the lower end of the rod 94 contacts with the convex portion of the disk 71, the detecting portion 96a contacts with the central portion 94b of the rod 94 and the detecting element 96 outputs ON signal.

The second detecting unit 93 is arranged with the first detecting unit 92 at a predetermined interval. The second detecting unit 93 has a similar structure with the first detecting unit 92, consisting of a rod 97, a compression spring 98 and a detecting element 99. The rod 97 is inserted into an opening 70b formed on the cover 70, in which diameter of an upper portion 97a is set to be smaller than that of a central portion 97b. The detecting element 99 has a detecting portion 99a. It is noted that output signals from the detecting sensor 35 will be descried as "output signal from the first detecting unit 92 (ON or OFF), output signal from the second detecting unit 93 (ON or OFF)" in the following description.

In the system controller 5, the magazine 12 is identified on the basis of ID information from the ID chip 29, to compare output signal from the detecting sensor 35 at the present loading of the magazine 12 and output signal from the detecting sensor 35 at the last loading of the magazine 12. When these output signals are identical, it is judged that the magazine lid 36 remains closed, i.e., the open/close history is regarded as "Close", and the history is stored in a storage section in the system controller 5. When the output signals are not identical, it is judged that the magazine lid 36 was opened and closed, i.e., the open/close history is regarded as "Open", and the history is stored in a storage section in the system controller 5.

Next, operation of the open/close history recording device 30 and the detecting sensor 35 will be described. As shown in FIG. 4A, when the magazine lid 36 is opened, the supporting arm 81 is rotated in a clockwise direction by spring biasing with the disk 71 stopped, to contact to the stopper 82. During the operation, the pushing arm 83 is slid to the protruding portion 75f of the disk 71, and the pushing portion 83a is caught on the protruding portion 75f. The roller 87 of the stopper mechanism 73 is fit in the space between the protruding portions 75b and 75e by bias of the leaf spring 88.

At the time of opening the magazine lid 36, the rod 94 (shown as the area 77) contacts to the concave portion 74d and the rod 97 (shown as the area 78) contacts to the convex portion 74f. The detecting sensor 35 outputs output signal "ON, Off".

Figure 4B:
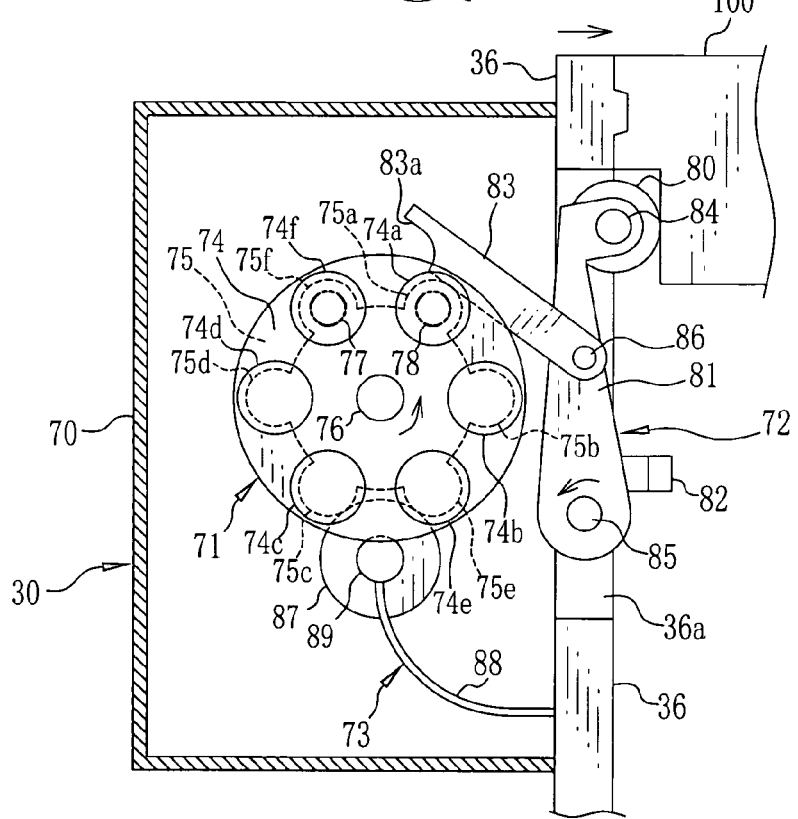

As shown in FIG. 4B, when the magazine lid 36 is closed, a magazine sidewall 100 partially pushes the roller 80, and the supporting arm 81 is rotated in a counterclockwise direction against the spring biasing. During the operation, the pushing portion 83a of the pushing arm 83 pushes out the protruding portion 75f, to rotate the disk 71 in a counter-clockwise direction. When the disk 71 is rotated, the roller 87 of the stopper mechanism 73 is once retreated with its rotation against the bias of the spring 88, to be retracted in the space between the protruding portions 75e and 75c. Accordingly, the rotation of the disk 71 is controlled to a predetermined rotation amount. The predetermined rotation amount is a value which is calculated by dividing 360 degree into the number of the protruding portions, in which the value is 60 degree in the present embodiment.

At the time of closing the magazine lid 36, the rod 94 contacts to the convex portion 74f and the rod 97 contacts to the concave portion 74a. The detecting sensor 35 outputs output signal "ON, Off".

In the system controller 5, the output signal "OFF, ON" from the detecting sensor 35 last time and the output signal "ON, OFF" from the detecting sensor 35 this time are compared. Since these output signals are not identical, the open/close history is regarded as "Open" and the history is stored in a storage section of the system controller 5.

As shown in FIG. 1, the power transmission device 13 is provided in an image recording apparatus main body 2a near the magazine room 24 and conveys power to the pulley 26 in the magazine 12 when the magazine 12 is loaded in the magazine room 24. The power transmission device 13 consists of the belt 42, a pulse motor 43, rollers 44 and 45, and a tension roller 46. The belt 42 is hung around the rollers 44 and 45 and the tension roller 46. The pulse motor 43 rotates according to pulse signals sent from the system controller 5. Because the roller 44 is mounted on a shaft of the pulse motor 43, the roller 44 rotates together with the pulse motor 43. The system controller 5 detects the rotational number of the pulse motor 43 by monitoring the number of pulse signals sent to the pulse motor 43, and calculates based on the rotational number of the pulse motor 43 a travel distance of the belt 42 and thus a rotational amount of the drive roller 25, which correspond to a transport amount of the recording paper 22. The tension roller 46 is mounted on a leading end of a not-shown tension arm and is biased in the transport direction of the recording paper to adjust tension of the belt 42 appropriately.

As shown in FIG. 2, the splice sensor 14 is placed near the paper outlet 33 of the loaded magazine 12. And the cutter 15 is arranged ahead the splice sensor 14 in the paper feed out direction of the recording paper 22. The splice sensor 14 is a transmission sensor to detect a splice mark (notch) of the recording paper 22. When the splice mark is detected, the spliced portion of the recording paper 22 is cut by the cutter 15 and thrown away. In this embodiment, the splice sensor 14 is also used to detect the leading edge of the recording paper 22. The detection values of the splice sensor 14 are sent to the system controller 5.

Being transmitted power from a motor 47 that is driven based on the command of the system controller 5, the cutter 15 carries out the edge treatment to cut the leading end of the recording paper 22, a size-cutting to cut the recording paper 22 into a given size, and the above-mentioned splice-cutting. The cutter 15 and the motor 47 constitute a cutter device.

Prior to the edge treatment to cut the leading end of the recording paper 22, the system controller 5 judges whether to perform the edge treatment or not. Now the judgment will be explained while referring to the flowchart in FIG. 3.

When the magazine 12 is loaded in the magazine room 24, and the splice sensor 14 does not detect the recording paper 22 but the end sensor 28 detects one, the system controller 5 sends a drive signal to the above-mentioned pulse motor 43, thereby feeding the recording paper 22 toward the cutter 15. In a short time, the splice sensor 14 detects the leading edge of the recording paper 22. Out of the transport amount of the recording paper 22 till the splice sensor 14 detects it, the system controller 5 calculates a protruding length of the recording paper 22 from the magazine 12. In this situation, a minus value of the calculated protruding length means that the leading edge of the recording paper 22 is located before the dashed line 37 in the paper feed out direction when the magazine 12 is loaded in the magazine room 24. A plus value of the protruding length means that the leading edge of the recording paper 22 is located ahead the dashed line 37 in the paper feed out direction. When the protruding length is a minus value, the system controller 5 judges that the edge treatment is unnecessary because there is no dust and fog in the leading end. On the other hand when the protruding length is a plus value, the system controller 5 judges that the edge treatment is necessary because the protruded leading area can be stained or fogged. This judgment is called a first judgment. The result of the first judgment is recorded in the memory 8.

The system controller 5 then judges according to the open/close history of the magazine lid 36. When the open/close history of the magazine lid 36 is Close, the system controller 5 judges that the edge treatment is unnecessary because the magazine 12 contains an in-use recording paper which has already had the edge treatment. On the other hand when the open/close history of the magazine lid 36 is Open, the system controller 5 judges that the edge treatment is necessary because the magazine 12 contains an unused recording paper which has not had the edge treatment yet. This judgment is called a second judgment. The result of the second judgment is recorded in the memory 8 in addition to the result of the first judgment. The system controller 5 gives a cutting command to the cutter 15 when at least one of the first and second judgments indicates the need for the edge treatment. After finishing the edge treatment, the result of the judgment recorded in the memory 8 is cleared.

In other words, the edge treatment can be carried out for the in-use recording paper 22 not when the leading end has no dust and fog but when the leading end has dust and fog for example because the pulley 26 is driven accidentally. Thus, the edge treatment is carried out only in necessary cases, so the waste of the recording paper 22 is reduced. Moreover it also ensures the edge treatment for the unused recording paper 22.

As shown in FIG. 1, the back-printing device 16 is provided ahead the cutter 15 in the paper feed out direction. The back-printing device 16 prints such necessary information as a frame serial number and correction data on a backside of the recording paper 22 after being cut. The shift mechanism 17 placed ahead the back-printing device 16 in the paper feed out direction is provided with a shift roller that is movable for example in a width direction of the recording paper 22 to shift the recording paper 22 in its width direction. The exposure device 18 located ahead the shift mechanism 17 in the paper feed out direction has a known laser printer, and exposes the recording paper 22 to record a latent image thereon based on image data stored an internal image memory or those transferred from a not-shown image-reading apparatus.

After having the latent image recorded thereon, the recording paper 22 is sent to the processor section 4. The processor section 4 consists of a developing device 51, a drying device 52 and a sheet ejection device 53. The developing device 51 is provided with a developing tank 54, a bleach fix tank 55 and wash tanks 60 consisting of a first wash tank 56, a second wash tank 57, a third wash tank 58 and a fourth wash tank 59 in this order from the upstream of the feed out direction of the recording paper 22. The developing tank 54, the bleach fix tank 55 and the first to fourth wash tanks 56, 57, 58 and 59 contains a given amount of develop solution, beach-fix bath and wash water respectively. The recording paper 22 is developed, fixed and washed by being conveyed through the respective processing tanks by driving force of conveyer racks which are placed respectively in the developing tank 54, the bleach fix tank 55 and the first to fourth wash tanks 56, 57, 58 and 59.

The drying device 52 is arranged above respective processing tanks and consists of a conveyer belt and a fan duct. The fan duct blows dry air heated by a heater to the conveyer belt and presses the recording paper 22 on the conveyer belt. Letting the recording paper 22 pass above the fan duct in this state removes water from the recording paper 22. After being passed through the dry device 52, the recording paper 22 is sent to the sheet ejection device 53. The sheet ejection device 53 distributes the recording paper 22 according to sizes or jobs of photo prints and ejects it into a tray that is not shown but provided in the processor section 4.

Now the operation of the above described embodiment will be explained. When the magazine 12 containing in-use or unused recording paper 22 is loaded in the magazine room 24, the pulley 26 in the magazine 12 engages with the belt 42 of the power transmission device 13, which enables feeding out the recording paper 22. Just after loading the magazine 12, the splice sensor 14 does not detect the recording paper 22, but the end sensor 28 detects one.

After feeding out the recording paper 22, the first and second judgments are done according to the transport amount of the recording paper 22 and the open/close history of the magazine lid 36. The results of the judgments are written in the memory 8. When at least one of the first and second judgments indicates the need for the edge treatment, the recording paper 22 is stopped at a predetermined position and the cutter 15 works for the edge treatment. The edge treatment is to cut a given length of the recording paper 22 from its leading edge. When neither the first nor second judgment indicates the need for the edge treatment, the edge treatment isn't performed, which avoids waste of the recording paper 22. After this operation, the recording paper 22 is cut into a given print size by the cutter 15 and becomes a photo print through the photographic processing, including exposure, developing and drying.

When the end sensor 28 does not detect the recording paper 22 anymore during the processing, but the splice sensor 14 detects it, the display 7 shows a warning that the magazine 12 runs out of the recording paper 22.

When the magazine 12 containing the in-use recording paper 22 is removed from the magazine room 24 in order to change the print size, the above-mentioned rewind treatment is carried out before the removal. After the rewind treatment, the magazine 12 is removed from the magazine room 24 and the magazine containing the recording paper of different width is loaded. Then the above-mentioned operations are repeated.

In the above described embodiment, a constant length of the recording paper 22 is cut from its leading edge in the edge treatment whenever the need for the edge treatment is indicated by the first judgment or the second judgment. Alternatively, it is possible to cut a first length when only the first judgment indicates the need for the edge treatment, and cut a second length when only the second judgment indicates the need for the edge treatment. And when both the first and second judgments indicate the need for the edge treatment, the leading end is cut by a longer length chosen between the first and second lengths, wherein the first length is a protruding length from the magazine 12, whereas the second length is a length of an area where the risk of fogging, irregular cutting or fingerprints is high. Because only the necessary length is cut in the edge treatment, the waste of recording paper 22 is reduced to the minimum.

In the above described embodiment, a predetermined length of the recording paper 22 is cut from its leading edge when the edge treatment is carried out. It is alternatively possible to show a message on the display 7 to prompt designating a length to be cut from the recording paper 22, and cut the length designated by the operator. It is also possible to carry out the second judgment prior to the first judgment for the edge treatments.

In the above described embodiment, the end sensor 28 is arranged before the rewind position 38 in the paper feed out direction. It is, however, possible to place the end sensor 28 downstream of the rewind position 38 in the paper feed out direction but within a magazine 12. In this case, if the end sensor 28 does not detect the recording paper 22 and the open/close history is Close when the magazine 12 is loaded, it is clear that the recording paper 22 does not need the edge treatment. For this reason, this embodiment makes it possible to start preparation for an exposure device 51 and others promptly.

Although the drive roller 25 in the magazine 12 is rotated by the power transmitted through the belt 42 and the pulley 26 in the above embodiment, it is possible to use a gear train and a joint instead of the belt 42 and the pulley 26. The image recording apparatus of the above described embodiment can be loaded with a single magazine, but the present invention is applicable to an image recording apparatus which can be loaded with plural magazines.

In the above described embodiment, the photosensitive recording paper is used as a recording material. But it is possible to use other kinds of recording paper including heat sensitive recording paper, magnetic recording paper and plain paper.

In the above described embodiment, the detecting sensor 35 is provided on the magazine 12, but it may be provided on the main body 2a of the apparatus.

In the above described embodiment, the rotatable disk 71 has the surface formed with the concavity and convexity. But a structure of the disk is not limited to this, for example, the present invention is applicable to a rotatable disk formed with a cutout, which is detected by a transmission type or a reflection type sensor. Moreover, the present invention is applicable to a rotatable disk with different colors by each section partitioned in the surface. In this case, a change of the color on the disk is detected by a color sensor. Furthermore, the present invention is applicable to a rotatable disk provided with a ferromagnetic material part and a non-ferromagnetic material part which is detected by a magnetic sensor.

Figure 6:
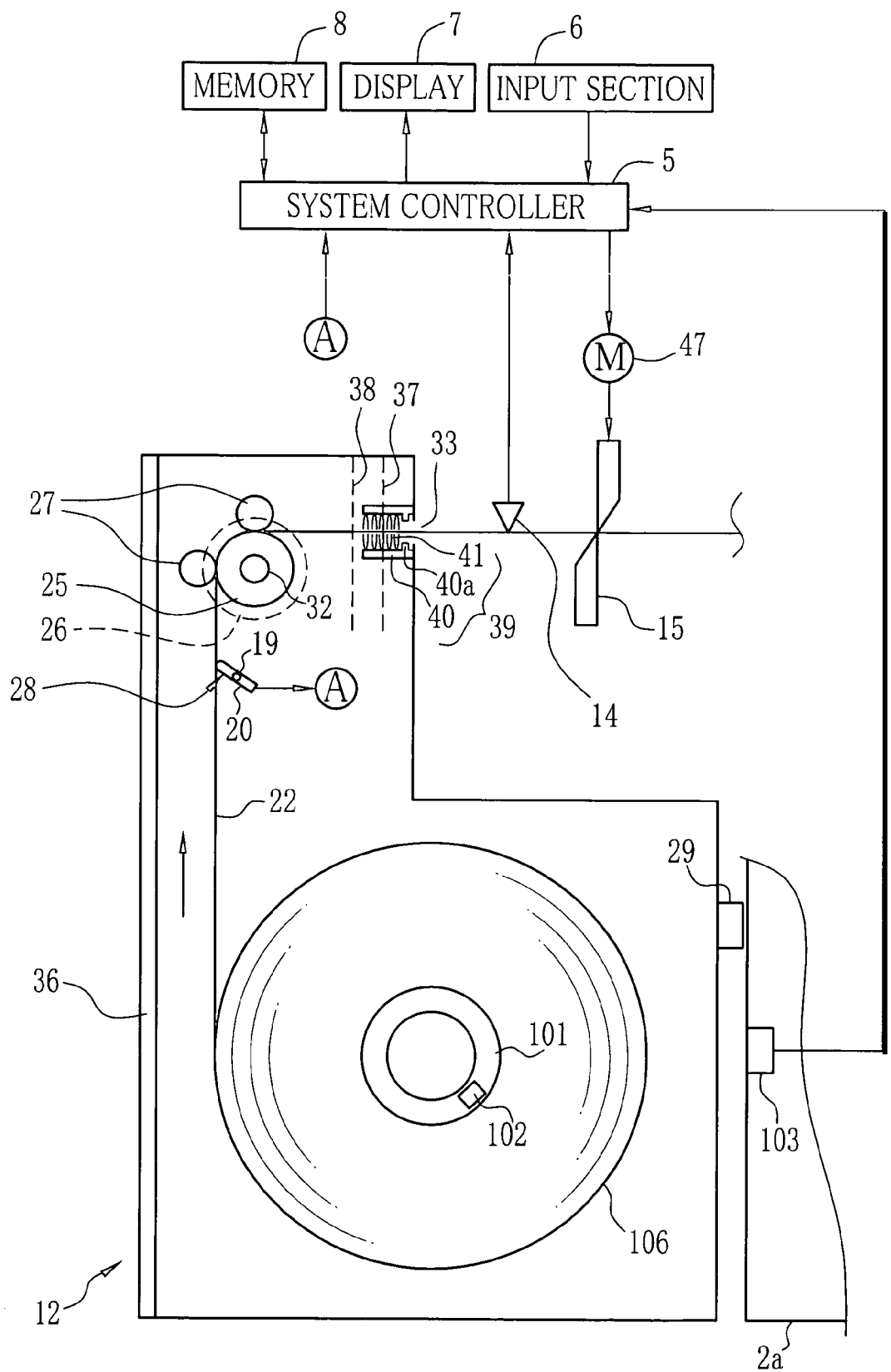
FIG. 6 is a schematic diagram illustrating a detecting device according to a second embodiment of the invention.

In the above-described embodiment, the detecting device has a structure that open/close operation of the magazine lid 36 is mechanically detected, but the present invention is not limited to this. For example, shown in FIG. 6, the present invention is applicable to a structure that an IC tag 102 is set in a winding core 101 for winding a recording sheet 106, to judge whether the open/close history is Open or Close, in other words, the recording paper 106 is not used or is in-use, based on the information of the IC tag 102. In the identical magazine, when the IC tag 102 is different from the previous one, the open/close history represents that said magazine lid was opened, i.e., the recording paper is not used. When the IC tag 102 is same as the last one, the open/close history represents that said magazine lid was closed, i.e., the recording paper is in-use. The IC tag 102 records identification information such as a recording material ID number, a manufacture lot, a surface characteristic information on the recording-surface, and a paper width. The identification information in the IC tag 102 is read by a reading apparatus 103 provided on the main body 2a of the image recording apparatus 2. It is noted that the reading apparatus 103 may be provided on the magazine 12.

As described so far, the present invention is not to be limited to the above embodiments but, on the contrary, various modification will be possible without departing from the scope and spirit of claims appended hereto.

What is claimed is:

1. An image recording apparatus for recording an image on a recording material comprising:
   a magazine containing a long web of the recording material, said magazine being removably loaded in a main body of said image recording apparatus;
   a cutter for cutting the recording material before the recording material is fed into an image recording section of said image recording apparatus;
   a sensor for detecting a leading end of the recording material at a position before said cutter in a feed out direction of the recording material;
   a detection device for detecting a transport amount of the recording material till the leading end of the recording material is detected by said sensor; and
   a control device for controlling an edge treatment to cut the leading end of the recording material by a given length by use of said cutter if the detected transport amount is less than a predetermined value, wherein
   said magazine comprises a device for recording an open/close history of a lid of said magazine, which is opened and closed to set the recording material in said magazine, and said control device reads the open/close history from said recording device, to control said cutter to carry out the edge treatment if the open/close history indicates that said magazine lid was opened while said magazine was removed from said image recording apparatus, regardless of whether the detected transport amount is less or more than said predetermined value, and
   said control device controls the edge treatment such that the leading end is cut by a first length if the detected transport amount is less than said predetermined value but the open/close history indicates that said magazine lid is kept closed, that the leading end is cut by a second length if the detected transport amount is more than said predetermined value but the open/close history indicates that said magazine lid was opened, and that said leading end is cut by a longer length chosen between said first and second lengths if the detected transport amount is less than said predetermined value and also the open/close history indicates that said magazine lid was opened.

2. An image recording apparatus as claimed in claim 1, wherein said first length is a protruding length of the leading end from a predetermined internal position of said magazine, whereas said second length is a length of an area of the recording material where the risk of fogging, irregular cutting or fingerprints is high.

* * * * *